(12) United States Patent
Walter et al.

(10) Patent No.: US 6,574,643 B2
(45) Date of Patent: *Jun. 3, 2003

(54) FAT FILE SYSTEM IN PALM OS COMPUTER

(75) Inventors: Mike W. Walter, Urbandale, IA (US); Trevor E. Meyer, Des Moines, IA (US)

(73) Assignee: TRG Products, Inc., Des Moines, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/155,561

(22) Filed: May 24, 2002

(65) Prior Publication Data

US 2003/0009442 A1 Jan. 9, 2003

Related U.S. Application Data

(63) Continuation of application No. 09/479,525, filed on Jan. 7, 2000, now Pat. No. 6,424,975.

(51) Int. Cl.[7] .............................................. G06F 17/30
(52) U.S. Cl. ............................................ 707/205; 707/8
(58) Field of Search ............................... 707/104.1, 10, 707/100, 8, 2; 713/2; 711/111

(56) References Cited

U.S. PATENT DOCUMENTS

| 6,389,420 B1 | * | 5/2002 | Vahalia et al. .................. 707/8 |
| 6,449,716 B1 | * | 9/2002 | Rickey, Albert E. ........... 713/2 |
| 6,470,345 B1 | * | 10/2002 | Doutre et al. ............... 707/100 |
| 6,477,616 B1 | * | 11/2002 | Takahashi, Tsuyoshi .... 711/111 |

* cited by examiner

Primary Examiner—Diane D. Mizrahi
(74) Attorney, Agent, or Firm—Simmons Perrine Albright & Ellwood PLC

(57) ABSTRACT

A handheld computer which uses a palm operating system and which incorporates a compact flash (CF+) interface for secondary data storage or interface to other devices and uses a FAT file system for file management with said CF+ media. The disclosure further include references to alternate types of secondary storage such as disk drives and multimedia cards and further discloses that the handheld computer may be embodied in a portable telephone or scanner.

20 Claims, 1 Drawing Sheet

FAT FILE SYSTEM IN PALM OS COMPUTER

CROSS REFERENCE TO RELATED APPLICATION

This application is a continuation application of prior application Ser. No. 09/479,525 filed on Jan. 7, 2000, now U.S. Pat. No. 6,424,975.

This application relates to an application entitled SYSTEM AND METHOD FOR USE OF SECONDARY STORAGE WITH A HANDHELD PALM COMPUTER, application Ser. No. 09/479,352, filed on Jan. 7, 2000, and assigned to a common assignee, and hereby incorporated herein in its entirety.

FIELD OF THE INVENTION

The present invention generally relates to handheld computers, and more particularly relates to handheld computers using a palm operating system, and even more particularly relates to a system and method for using fat file systems in a handheld computer using the palm operating system.

BACKGROUND OF THE INVENTION

In the past, users of handheld computers using the palm operating system and derivatives thereof have been required to use a special file management system unique to the palm operating system environment. While this prior art palm file management system has been very successful in the past, it has several drawbacks.

First of all, the palm operating system environment does not have the capability for enhancement of the system through the use of secondary data storage devices. Secondly, the palm operating system environment does not support industry standard files such as normally used in personal computers. The palm operating system and derivatives of it are limited to use of .prc and .pdb formatted files, which are hereafter referred to as "palm file formats". Conversely, all file formats other than .prc and .pdb may be referred to hereafter as "non-palm file formats".

Consequently, there exists a need for improvement in use of secondary storage and standard pc formatted files used with handheld computers using a palm operating system and similar operating systems.

SUMMARY OF THE INVENTION

It is an object of the present invention to enhance the capabilities of handheld computers.

It is another object of the present invention to provide secondary storage for a handheld computer using a palm operating system like operating system.

It is a feature of the present invention to include a File Allocation Table (FAT) file system, (hereafter collectively referred to as "Ffs") in conjunction with a palm operating system like operating system.

It is an advantage of the present invention to provide the capability for secondary storage and use of pc industry standard file types in a palm operating system environment.

The present invention is an apparatus and method for enhancing the capabilities of a handheld computer using the palm operating system by use of an Ffs, which is designed to satisfy the aforementioned needs, provide the previously stated objects, include the abovelisted features, and achieve the already articulated advantages. The present invention is carried out in a ".prc and .pdb-less system" in a sense that the limitation to using only .prc and .pdb file extensions has been eliminated.

Accordingly, the present invention is a system and method for enhancing the capabilities of a handheld computer using the palm operating system, which is operable with an Ffs.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
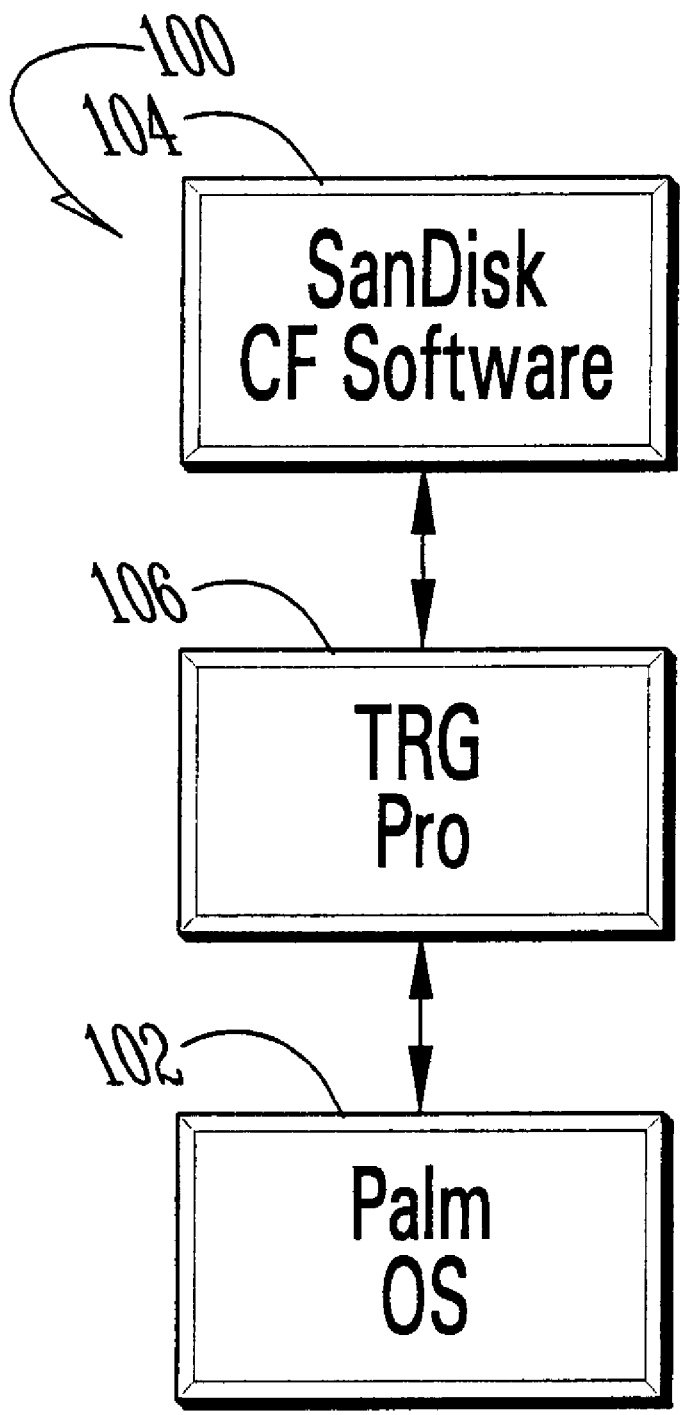
FIG. 1 is a simplified block diagram representation of the enhanced operating system software of a handheld computer of the present invention.

Now referring to the drawings, where like numerals refer to like text throughout, and more particularly to FIG. 1, there is shown a simplified block diagram of the present invention, generally designated 100, including a Palm OS block 102, which represents prior art and well-known operating system software commercially available from 3COM corporation for use in conjunction with handheld computers manufactured and sold by 3COM, hereafter Palm computers. The term "handheld computer" is intended to be construed broadly so as to include any handheld electronic device which processes information such as portable phones, scanners, etc. The above-referenced patent application also includes discussion with respect to the Palm OS. Also shown in FIG. 1 is SanDisk compact flash software block 104, which represents prior art, well-known and commercially available software from SanDisk Corporation of Sunnyvale Calif. SanDisk compact flash software block 104 includes well-known and industry standard software used to implement Ffs's in compact flash devices in conjunction with the Windows family of operating systems. The present invention achieves its beneficial aspects through combination of Palm OS block 102, SanDisk compact flash software block 104, and TRGpro interface software 106, which is novel and innovative software used to port the SanDisk compact flash software block 104 to the Palm OS block 102.

The following description is first intended to provide broad background information, then provide detailed information relating to one preferred approach to carrying out the present invention.

FAT File System Library

This section of the detailed description is intended to introduce the use of, and provide a reference to, the Ffs (FAT File System) Library procedures. It is directed toward Palm OS application developers who wish to access CF cards from within their applications. It is assumed that the reader is familiar with the C programming language, in particular within the context of the Palm OS.

Section 1 of this document gives background detail on the FAT file system. Section 2 describes the use of shared libraries in Palm OS applications, summarizing the functionality provided by the Ffs Library. Section 3 details the shared data structures used by multiple functions in the Ffs library and describes each of the library calls, describing their function, parameters, and return value. Section 4 lists the possible error codes and their interpretation, and Section 5 discusses a sample project.

Section 1—FAT File System Overview

The FAT file system in this document refers to a system of file management on a storage device. The device is divided into clusters, each of which can be composed of one or more sectors. A cluster can be in one of three states:

Allocated to a file

Allocated to a directory

Unused or free

The mapping of the clusters is contained in a File Allocation Table (FAT), which is where the file system gets its name.

TRGpro and the FAT File System

The hand held computer of the present invention, hereafter referred to as "TRGpro", is merely an example of many different approaches to practicing the present invention. In this example, the TRGpro is a computing device built upon industry standards. It was designed with a slot to accept CompactFlash devices, which are rapidly becoming the standard for handheld computers. In keeping with this eye toward standards, its internal implementation for accessing CompactFlash memory cards is based upon a FAT file system.

The true advantage to using the FAT file system is that it is a standard also supported by PC's running any of the following operating systems:

MS-DOS (all versions)

Windows 3.1

Windows 95

Windows 98

Windows NT (all versions)

Windows 2000

For the TRGpro, the removable media is a CompactFlash memory card, but other media could be used as well. It should be noted that while it is believed that CompactFlash devices and memory cards may be presently be the preferred media for secondary storage of information, the present invention is intended to include uses of other secondary storage media such as multimedia cards, disk drives and etc. The benefits of a Ffs in combination with a Palm OS like operating system can be achieved irrespective of any particular secondary storage implementation.

Section 2—Ffs Library Overview

The Purpose of the FAT File System Library

The FAT File System (Ffs) shared library provides an interface to Compact Flash (CF) cards containing a FAT File System. The interface is based upon the unbuffered file/disk system and library calls typically used with the C language. Support is provided for manipulating both files and directories, simplifying the exchange of data between the Palm device and a PC. In addition, the high-capacities of existing CF cards allow Ffs-aware applications to create, read, and modify files much larger than the total storage space available on existing Palm devices. A document reader, for example, could access documents directly on a CF card, without first having to move the documents in the Palm device RAM or Flash.

Loading, Unloading, and Accessing the Ffs Shared Library

Currently, the Ffs Library is implemented as a Palm OS shared library. To access the Ffs calls, an application must search for the library, load the library if not found, then open the library. Opening the library returns a library reference number that is used to access the individual functions within the library. When the application is finished with the library, it should close the library. The current version of the library does not support the sharing of open flies between applications, and only one application should have the library open at any one time (though the system may have it open, also).

In one embodiment the calling application must include the header file ffslib.h. The source code of ffslib.h is included in its entirety at the end of this detailed description. This file contains the required constant definitions, structure typedefs, and function prototypes for the library. In addition, this file maps library functions calls to the corresponding system trap instructions, through which all library routines are accessed. If the caller requires notification of CF card insertion/removal events, it must also include notify.h and the PalmOS header NotifyMgr.h (requires OS 3.3 headers).

To find a loaded library, an application calls SysLibFind, specifying the library. If not found, an application loads the library using SysLibLoad, specifying the library type and creator IDs. For the Ffs library, the name, type and creator IDs are defined in ffslib.h as FfsLibName, FfsLibTypeID and FfsLibCreatorID, respectively. After loading the library, it must be opened with a call to FfsLibOpen. Opening the library allocates and initializes its global variables, and sets up the CF socket hardware.

Once the library is open, the application may make calls to the library functions. The first parameter to a library call is always the library reference number returned when the library is loaded. Most library calls return an integer result of 0 on success and −1 on failure. A more specific error code may be obtained through another library call.

The application that opens the library is responsible for closing and optionally unloading the library. The library is closed with the FfsLibClose call, and unloaded with the SysLibRemove call. The library can only be removed, however, if it is not in use by the system, as indicated by the value 0 returned from FfsLibClose. If still in use, FfsLibClose returns FFS_ERR_LIB_IN_USE. It is possible for an application to leave the library loaded when exiting. The library may then be accessed by other applications through the SysLibFind call, which returns a reference to an already-loaded library. Once the reference number is obtained, the library is opened as usual with FfsLibOpen call. In either case, however, the caller must open the library on startup and close it on exit. The library should not be left open between applications.

Currently, the name of the Ffs library used for SysLibFind is "Fsf.lib," the creator ID is "FfsL," and the type ID is "libr." These constants are all defined in ffslib.h.

Summary of Ffs Library Functions

The Ffs library calls may be grouped into six categories: disk management, directory management, file access, file management, library management, and error handling. The calls, grouped by category, are listed below, with brief descriptions of each call's function. An alphabetical listing with a detailed specification of each call is given in section 3.

Disk management

| | |
|---|---|
| FfsCardIsATA | check if inserted card is an ATA device. |
| FfsCardInserted | check if a CF card is inserted. |
| FfsFlushdisk | flush all buffers to flash. |
| FfsFormat | format the card. |
| FfsGetdiskfree | get the total size of the CF disk, and the amount of free space. |
| FfsGetdrive | get the current working drive number. |
| FfsSetdrive | set the current working drive number. |

Directory management

| | |
|---|---|
| FfsChdir | change the current working directory. |
| FfsFinddone | free resources after a directory search. |
| FfsFindfirst | start a directory search. |
| FfsFindnext | continue a directory search. |
| FfsGetcwd | get the current working directory. |
| FfsIsDir | check if the specified path is a directory or file. |
| FfsMkdir | create a directory. |
| FfsRename | rename a directory. |
| FfsRmdir | remove a directory. |

File access

| | |
|---|---|
| FfsClose | close a file. |
| FfsCreat | create a new file. |
| FfsEof | check if the current file pointer is at the end of the file. |
| FfsLseek | move a file pointer. |
| FfsOpen | open/create a file. |
| FfsTell | get the current file pointer value. |
| FfsWrite | write to a file. |

File management

| | |
|---|---|
| FfsFlush | flush an open file to disk. |
| FfsFstat | get information about an open file. |
| FfsGetfileattr | get file attributes. |
| FfsRemove | delete a file. |

-continued

| | |
|---|---|
| FfsRename | rename a file. |
| FfsSetfileattr | set file attributes. |
| FfsStat | get information about a file. |
| FfsUnlink | delete a file (same as FfsRemove). |
| Library management | |
| FfsGetLibAPIVersion | get the Ffs library version number. |
| FfsLibClose | close the library. |
| FfsLibOpen | open the library. |
| Error handling | |
| FfsGetErrno | get the current global error result code. |
| FfsInstallErrorHandler | install a critical error handler callback function. |
| FfsUnInstallErrorHandler | remove the critical error handler callback function. |

For the most part, these functions implement the low-level unbuffered I/O functions found in the C language. The buffered stream I/O functions, such as fopen and fprintf, are not supported, though they could be built on top of the Ffs library layer.

Although many Ffs library calls accept a drive letter as part of the path string, and routines are provided to get and set the default drive, the Ffs library and Nomad hardware currently support only a single drive. This drive is signified as number 0 or 1 (0 indicates current drive, 1 indicates the first drive), and path The Global Error Result Code Most of the Ffs library calls return an integer error indicator, set to 0 for success and −1 for failure. Library calls that return some other type of value, such as a pointer or file offset, always reserve one value to indicate an error. In either case, a specific error code is loaded into the global errno variable. The errno variable is not cleared on a successful call, so at any given time it contains the last error code generated. The current errno value may be retrieved by calling FfsGetErrno.

Critical Error Handler Callback

If an I/O error occurs when accessing the CF card, a critical error handler is called. The critical error handler is responsible for deciding whether to abort or retry the current operation, to mark a failed sector as bad, or to reformat the card. The actual choices available in a specific situation are dependent on the type of critical error that occurred, and are determined by the internal critical error handler.

Regardless of the type of critical error that occurred, "abort current operation" is always a choice, and is the default action taken by the critical error handler. The calling program may supply its own critical error handler, however, to prompt the user for the desired course of action. A custom critical error handler is installed by a call to FfsInstallErrorHandler. The custom error handler takes as parameters a drive number, a code indicating the valid responses, and a string containing the specific error message, and returns the desired course of action. In current versions of the library, the drive number will always be 0. The codes defining the valid responses are listed below, along with corresponding course of action codes:

CRERR_NOTIFY_ABORT FORMAT: CRERR_RESP_ABORT or CRERR_RESP_FORMAT.
CRERR_NOTIFY_CLEAR_ABORT_RETRY: CRERR_RESP_ABORT, CRERR_RESP_RETRY, or CRERR_RESP_CLEAR.
CRERR_NOTIFY_ABORT_RETRY: CRERR_RESP_ABORT or CRERR_RESP_RETRY.

The course of action codes are interpreted by the internal critical error handler as follows:

CRERR_RESP_ABORT: Abort the current operation.
CRERR_RESP_RETRY: Retry the current operation.
CRERR_RESP_FORMAT: Attempt to format the card.
CRERR_RESP_CLEAR: Clear corrupt sector and retry the current operation.

These codes are all defined in file ffslib.h.

The custom critical error handler will typically display an alert box containing the error message text passed in from the internal critical error handler and prompting the user with the choices appropriate for the error type. For example, if the CF card is removed during an operation, the custom error handler will be called with a response code of CRERR_NOTIFY_ABORT_RETRY and an error message of "Bad card". The error handler would then display an alert with buttons for "Abort" and "Retry". Note that the "Abort" button should return the default value 0, in case the user presses an application launch button when the alert is displayed (in this case, the system will force the default return value from all alerts until the running application terminates).

Card Insertion/Removal Notify

When a CF card is removed while the Ffs Library is loaded, the library automatically clears all data structures associated with the card and reinitializes in preparation for the next card. Thus, if a card is removed during a library call, the library will not be able to complete the call even if the card is reinserted. This is an unfortunate side effect of the fact that most CF storage cards are missing the unique serial number in the drive ID information that is used to identify the cards. Because of this omission, the library is unable to determine if a reinserted card is identical to the previously loaded card.

The library reinitialization is invisible to the calling application. In order to notify the caller of insertion/removal events, a launch code can be sent by the system to the application. Applications "register" at startup for notification of CF insertion/removal events, and are then sent the launch code sysAppLaunchCmdNotify when these events occur. The cmdPBP points to a SysNotifyParamType object, containing a field notifyParamP which in turn points to a Uint32 containing one of the following event types (defined in notify.h):

CFEventCardInserted: a CF card has been inserted.
CFEventCardRemoved: a CF card has been removed.
CFEventPowerIsBackOn: the device just powered up, the card may have changed while the device was off.

An application registers for notification by calling SysNotifyRegister, defined in system header file NotifyMgr.h. The parameters, briefly, are as follows:

cardNo: card number of calling application.
dbID: database ID of calling application.
notifyType: must be sysNotifyCFEvent, defined in notify.h.
callbackP: not used, should be NULL.
priority: not used, should be 0.
userDataP: not used, should be NULL.

When an application exits, it should unregister by calling SysNotifyUnregister, defined in system header file NotifyMgr.h. The parameters, briefly, are as follows:

cardNo: card number of registered application.
dbID: database ID of registered application.
notifyType: must be sysNotifyCFEvent, defined in notify.h.
priority: not used, should be 0.

Note that an application may, in theory, remain registered after exiting. However, any system event that causes the application's database ID to change (such as hot-syncing a new copy of the application) may cause a system crash during the next CF event.

The notification manager requires PalmOS 3.3 header files or above.

The source code of ffslib.h is as follows:

```
/******************************************************
 *
 *   Copyright (c) 1999, TRG, All Rights Reserved
 *
 *_____
 * FileName:
 *      FfsLib.h
 *
 * Description:
 *      Ffs library API definitions.
 *
 * Version:    1.1.1
 ******************************************************/ ifndef __FFS_LIB_H__
define __FFS_LIB_H__

/*_____
 * If we're actually compiling the library code, then we need to
 * eliminate the trap glue that would otherwise be generated from
 * this header file in order to prevent compiler errors in CW Pro 2.
 *_____*/
#ifdef BUILDING_FFS_LIB
    #define FFS_LIB_TRAP(trapNum)
#else
    #define FFS_LIB_TRAP(trapNum) SYS_TRAP(trapNum)
endif /******************************************************
 * Type and creator of Sample Library database – must match project defs!
 ******************************************************/
#define FfsLibCreatorID  'FfsL'   // Ffs Library database creator
define FfsLibTypeID     'libr'   // Standard library database type /******************************************************
 * Internal library name which can be passed to SysLibFind()
 ******************************************************/
```

```
#define FfsLibName      "Ffs.lib"

/*****************************************************************
 * Defines for Ffs library calls
 *****************************************************************/

/*_____
 * Ffs Library result codes
 * (appErrorClass is reserved for 3rd party apps/libraries.
 * It is defined in SystemMgr.h)
 *
 * These are for errors specific to loading/opening/closing the library
 *_____*/
#define FfsErrorClass           (appErrorClass | 0x300)

#define FFS_ERR_BAD_PARAM       (FfsErrorClass | 1)   // invalid parameter
#define FFS_ERR_LIB_NOT_OPEN    (FfsErrorClass | 2)   // library is not open
#define FFS_ERR_LIB_IN_USE      (FfsErrorClass | 3)   // library still in used
#define FFS_ERR_NO_MEMORY       (FfsErrorClass | 4)   // memory error occurred
#define FFS_ERR_NOT_SUPPORTED   (FfsErrorClass | 5)   // call not supported in this version
define FFS_ERR_CARD_IN_USE     (FfsErrorClass | 6)   // card in use by another app /*_____
 * Ffs Library call errno codes
 *
 * These are error codes returned by FfsGetErrno() – they are descriptive
 * error codes set when a call fails. They are stored in a global, and
 * FfsGetErrno() returns the current value (ie. the last error to occur).
 *_____*/
#define ENOENT    2    /* File not found or path to file not found   */
#define ENOMEM    8    /* not enough memory                          */
#define EBADF     9    /* Invalid file descriptor                    */
#define EACCES   13    /* Attempt to open a read only file or a special (directory) */
#define EINVDRV  15    /* Invalid drive specified                    */
#define EEXIST   17    /* Exclusive access requested but file already exists. */
#define EINVAL   22    /* Invalid argument                           */
#define ENFILE   24    /* No file descriptors available (too many files open) */
#define ENOSPC   28    /* Write failed. Presumably because of no space */
```

```
#define ESHARE    30   /* Open failed do to sharing             */
#define ENODEV    31   /* No valid device found                 */
#define ERANGE    34   /* Result too large                      */
#define EIOERR    35   /* I/O error                             */

/* low level errors during initialization */
#define BUS_ERC_DIAG       101  /* Drive diagnostic failed           */
#define BUS_ERC_ARGS       102  /* Bad argument during initialization */
#define BUS_ERC_DRQ        103  /* Drive DRQ is not valid.           */
#define BUS_ERC_TIMEOUT    104  /* Timeout during an operation       */
#define BUS_ERC_STATUS     105  /* Controller reported an error      */
#define BUS_ERC_ADDR_RANGE 106  /* LBA out of range                  */
#define BUS_ERC_CNTRL_INIT 107  /* Fail to initialize controller     */
#define BUS_ERC_IDDRV      108  /* Identify drive info error         */
#define BUS_ERC_CMD_MULT   109  /* Read/Write Multiple Command error */
#define BUS_ERC_BASE_ADDR  110  /* Base Address not valid            */
#define BUS_ERC_CARD_ATA   111  /* Card is not ATA                   */

/*----------------------------------------------
 * MS-DOS file attributes
 *
 * These are the file attributes used by MS-DOS to mark file types in the
 * directory entry. They are set by FfsSetfileattr() and retrieved by
 * FfsGetfileattr(), FfsStat(), and FfsFstat(). They are also used for
 * filtering by FfsFindfirst() and FfsFindnext().
 *
 * Note that Ffsfindfirst() and FfsFindnext() only return items which match
 * the specified attribute exactly (although FA_ARCH is ignored). For this
 * reason, a wildcard attribute FA_ALL is supplied (non-standard) which
 * matches all directory entries.
 *----------------------------------------------*/
#define FA_NORMAL   0x00    /* "normal" file                        */
#define FA_RDONLY   0x01    /* read only                            */
#define FA_HIDDEN   0x02    /* hidden file                          */
#define FA_SYSTEM   0x04    /* system file                          */
#define FA_LABEL    0x08    /* disk volume label                    */
#define FA_DIREC    0x10    /* subdirectory                         */
#define FA_ARCH     0x20    /* archive                              */
#define FA_ALL      0x8000  /* matches anything for FfsFindfirst()  */

/*----------------------------------------------
 * Lseek codes
 *
```

```
 * Determine the starting point of an Lseek command.
 *_____*/
#define SEEK_SET  0  /* offset from begining of file       */
#define SEEK_CUR  1  /* offset from current file pointer   */
#define SEEK_END  2  /* offset from end of file            */

/*_____
 * File mode bits
 *
 * Used by FfsOpen() and FfsCreat() to set the file read/write mode when
 * creating a new file.
 * NOTE: these are in octal
 *_____*/
#define S_IREAD   0000200  /* Read permitted. (Always true anyway)  */
#define S_IWRITE  0000400  /* Write permitted                       */

/*_____
 * Fstat, stat file type mode bits
 *
 * Current file type mode as returned by FfsFstat() and FfsStat(). One of
 * these mode bits will be OR'd with the read/write permission of the
 * file (S_IREAD, S_IWRITE).
 * NOTE: these are in octal
 *_____*/
#define S_IFCHR  0020000  /* character special (unused)  */
#define S_IFDIR  0040000  /* subdirectory                */
#define S_IFBLK  0060000  /* block special (unused)      */
#define S_IFREG  0100000  /* regular file                */
#define S_IFMT   0170000  /* type of file mask           */

/*_____
 * File access flags
 *
 * Used by FfsOpen() to set the file access permissions when opening a file.
 *_____*/
#define O_RDONLY      0x0000  /* Open for read only                    */
#define O_WRONLY      0x0001  /* Open for write only                   */
#define O_RDWR        0x0002  /* Read/write access allowed.            */
#define O_APPEND      0x0008  /* Seek to eof on each write             */
#define O_CREAT       0x0100  /* Create the file if it does not exist. */
#define O_TRUNC       0x0200  /* Truncate the file if it already exists */
#define O_EXCL        0x0400  /* Fail if creating and already exists   */
#define O_TEXT        0x4000  /* Ignored                               */
#define O_BINARY      0x8000  /* Ignored. All file access is binary    */
#define O_NOSHAREANY  0x0004  /* Wants this open to fail if already open. */
```

```
                    /* Other opens will fail while this open   */
                    /* is active                               */
#define O_NOSHAREWRITE 0x0800   /* Wants this opens to fail if already open */
                    /* for write. Other open for write calls   */
                    /* will fail while this open is active.    */

/*_____
 * Critical error defines
 *
 * Critical error NOTIFY and RESPONSE types – NOTIFY is sent to the caller's
 * critical error handler, which should respond with an appropriate response.
 *_____*/
#define CRERR_NOTIFY_ABORT_FORMAT       1  /* Abort, Format        */
#define CRERR_NOTIFY_CLEAR_ABORT_RETRY  2  /* Clear+retry, Abort, Retry */
define CRERR_NOTIFY_ABORT_RETRY        3  /* Abort, Retry         */ define CRERR_RESP_ABORT    1  /* Abort current operation  */
define CRERR_RESP_RETRY    2  /* Retry current operation  */
#define CRERR_RESP_FORMAT   3  /* Format the card          */
#define CRERR_RESP_CLEAR    4  /* Clear bad sector and retry */

/*****************************************************
 * Special types for FFS access
 *****************************************************/

/*_____
 * diskfree_t structure for FfsGetdiskfree()
 *_____*/
typedef struct {
    UInt32  avail_clusters;     /* number of free clusters          */
    UInt32  total_clusters;     /* total number of clusters on drive */
    UInt16  bytes_per_sector;   /* number bytes per sector          */
    UInt16  sectors_per_cluster; /* number sectors per cluster      */
} diskfree_t;

/*_____
 * ffblk structure for FfsFindfirst(), FfsFindnext()
 *_____*/
typedef struct {
    char   ff_reserved[21];  /* used by system – don't modify! */
    char   ff_attrib;        /* DOS file attributes            */
    Int16  ff_ftime;         /* creation time                  */
```

```c
    Int16 ff_fdate;      /* creation date              */
    Int32 ff_fsize;      /* file size                  */
    char  ff_name[13];   /* name in 8.3 format         */
    char  ff_longname[256]; /* long file name          */
} ffblk;

/*_____
 * stat structure used by FfsStat(), FfsFstat(). Structure date_t is used
 * in stat_t (it is defined as a long in some versions).
 *_____*/
typedef struct {
    UInt16 date;
    UInt16 time;
} date_t;

typedef struct {
    Int16  st_dev;    /* drive (always 1)           */
    Int16  st_ino;    /* not used                   */
    UInt32 st_mode;   /* file mode information      */
    Int16  st_nlink;  /* always 1                   */
    Int16  st_uid;    /* not used                   */
    Int16  st_gid;    /* not used                   */
    Int16  st_rdev;   /* same as st_dev             */
    UInt32 st_size;   /* file size                  */
    date_t st_atime;  /* creation date/time         */
    date_t st_mtime;  /* same as st_atime           */
    date_t st_ctime;  /* same as st_atime           */
    UInt8  st_attr;   /* file attributes (non-standard) */
} stat;

/***********************************************************
 * Ffs library function trap ID's. Each library call gets a trap number.
 * FfsLibTrapXXXX which serves as an index into the library's dispatch
 * table. The constant sysLibTrapCustom is the first available trap number
 * after the system predefined library traps Open,Close,Sleep & Wake.
 *
 * WARNING!!! The order of these traps MUST match the order of the dispatch
 * table in FfsLibDispatch.c!!!
 ***********************************************************/
typedef enum {
    FfsLibTrapGetLibAPIVersion = sysLibTrapCustom,
    FfsLibTrapGetdiskfree,
    FfsLibTrapFindfirst,
    FfsLibTrapFindnext,
    FfsLibTrapFinddone,
```

```
    FfsLibTrapFileOpen,
    FfsLibTrapFileClose,
    FfsLibTrapRead,
    FfsLibTrapWrite,
    FfsLibTrapRemove,
    FfsLibTrapChdir,
    FfsLibTrapGetcwd,
    FfsLibTrapMkdir,
    FfsLibTrapRmdir,
    FfsLibTrapFormat,
    FfsLibTrapRename,
    FfsLibTrapGetfileattr,
    FfsLibTrapFlush,
    FfsLibTrapFlushDisk,
    FfsLibTrapSetfileattr,
    FfsLibTrapStat,
    FfsLibTrapFstat,
    FfsLibTrapIsDir,
    FfsLibTrapLseek,
    FfsLibTrapGetErrno,
    FfsLibTrapTell,
    FfsLibTrapGetdrive,
    FfsLibTrapSetdrive,
    FfsLibTrapUnlink,
    FfsLibTrapEof,
    FfsLibTrapCreat,
    FfsLibTrapInstErrHandle,
    FfsLibTrapUnInstErrHandle,
    FfsLibTrapSetDebuggingOn,
    FfsLibTrapSetDebuggingOff,
    FfsLibTrapCardIsInserted,
    FfsLibTrapExerciseFAT,
    FfsLibTrapCardIsATA,
    FfsLibTrapChangeOccurred,
    FfsLibTrapLast
} FfsLibTrapNumberEnum;

/************************************************************
 *          CF FAT Filesystem API Prototypes
 ************************************************************/ ifdef __cplusplus
extern "C" {
#endif
```

```
/*----------------------------------------------
 * Standard library open, close, sleep and wake functions
 *---------------------------------------------*/

/* open the library */
extern Err FfsLibOpen(UInt16 libRef)
              FFS_LIB_TRAP(sysLibTrapOpen);

/* close the library */
extern Err FfsLibClose(UInt16 libRef)
              FFS_LIB_TRAP(sysLibTrapClose);

/* library sleep */
extern Err FfsLibSleep(UInt16 libRef)
              FFS_LIB_TRAP(sysLibTrapSleep);

/* library wakeup */
extern Err FfsLibWake(UInt16 libRef)
              FFS_LIB_TRAP(sysLibTrapWake);

/*----------------------------------------------
 * Custom library API functions
 *---------------------------------------------*/

/* Get our library API version */
extern Err FfsGetLibAPIVersion(UInt16 libRef, UInt32 *dwVerP)
              FFS_LIB_TRAP(FfsLibTrapGetLibAPIVersion);

/* Get disk free/total size */
extern Err FfsGetdiskfree(UInt16 libRef, UInt8 drive, diskfree_t *dtable)
              FFS_LIB_TRAP(FfsLibTrapGetdiskfree);

/* get first directory entry */
extern Err FfsFindfirst(UInt16 libRef, char *path, Int16 attrib, ffblk *ff_blk)
              FFS_LIB_TRAP(FfsLibTrapFindfirst);

/* get next directory entry */
extern Err FfsFindnext(UInt16 libRef, ffblk *ff_blk)
              FFS_LIB_TRAP(FfsLibTrapFindnext);

/* finish directory scan */
extern Err FfsFinddone(UInt16 libRef, ffblk *ff_blk)
              FFS_LIB_TRAP(FfsLibTrapFinddone);
```

```
/* open a file */
extern Int16 FfsOpen(UInt16 libRef, char *path, Int16 flags, Int16 mode)
            FFS_LIB_TRAP(FfsLibTrapFileOpen);

/* close a file */
extern Err FfsClose(UInt16 libRef, Int16 handle)
            FFS_LIB_TRAP(FfsLibTrapFileClose);

/* read from file */
extern Int16 FfsRead(UInt16 libRef, Int16 handle, void *buffer, Int16 num_bytes)
            FFS_LIB_TRAP(FfsLibTrapRead);

/* write to file */
extern Int16 FfsWrite(UInt16 libRef, Int16 handle, void *buffer, Int16 num_bytes)
            FFS_LIB_TRAP(FfsLibTrapWrite);

/* delete file */
extern Err FfsRemove(UInt16 libRef, char *path)
            FFS_LIB_TRAP(FfsLibTrapRemove);

/* set the current working directory */
extern Err FfsChdir(UInt16 libRef, char *path)
            FFS_LIB_TRAP(FfsLibTrapChdir);

/* ge the current working directory */
extern char *FfsGetcwd(UInt16 libRef, char *path, Int16 numchars)
            FFS_LIB_TRAP(FfsLibTrapGetcwd);

/* make a new directory */
extern Err FfsMkdir(UInt16 libRef, char *dirname)
            FFS_LIB_TRAP(FfsLibTrapMkdir);

/* delete a directory */
extern Err FfsRmdir(UInt16 libRef, char *dirname)
            FFS_LIB_TRAP(FfsLibTrapRmdir);

/* format a drive */
extern Err FfsFormat(UInt16 libRef, UInt16 drive)
            FFS_LIB_TRAP(FfsLibTrapFormat);

/* rename a file/directory */
extern Err FfsRename(UInt16 libRef, char *path, char *new_name)
            FFS_LIB_TRAP(FfsLibTrapRename);
```

```
/* get file/directory attributes */
extern Err FfsGetfileattr(UInt16 libRef, char *name, UInt16 *attr)
            FFS_LIB_TRAP(FfsLibTrapGetfileattr);

/* flush a file to disk */
extern Err FfsFlush(UInt16 libRef, Int16 handle)
            FFS_LIB_TRAP(FfsLibTrapFlush);

/* flush all buffers to disk */
extern Err FfsFlushDisk(UInt16 libRef, UInt16 drive)
            FFS_LIB_TRAP(FfsLibTrapFlushDisk);

/* set file attributes */
extern Err FfsSetfileattr(UInt16 libRef, char *name, UInt16 attr)
            FFS_LIB_TRAP(FfsLibTrapSetfileattr);

/* get information about a path */
extern Err FfsStat(UInt16 libRef, char *path, stat *pstat)
            FFS_LIB_TRAP(FfsLibTrapStat);

/* get information about an open file */
extern Err FfsFstat(UInt16 libRef, Int16 handle, stat *pstat)
            FFS_LIB_TRAP(FfsLibTrapFstat);

/* test if a path is a directory */
extern Err FfsIsDir(UInt16 libRef, char *path, Boolean *is_dir)
            FFS_LIB_TRAP(FfsLibTrapIsDir);

/* move file pointer */
extern Int32 FfsLseek(UInt16 libRef, Int16 handle, Int32 offset, Int16 origin)
            FFS_LIB_TRAP(FfsLibTrapLseek);

/* get the current errno (global error descriptor) value */
extern Int16 FfsGetErrno(UInt16 libRef)
            FFS_LIB_TRAP(FfsLibTrapGetErrno);

/* get the current file pointer */
extern Int32 FfsTell(UInt16 libRef, Int16 handle)
            FFS_LIB_TRAP(FfsLibTrapTell);

/* get default drive */
extern void FfsGetdrive(UInt16 libRef, UInt16 *drive)
            FFS_LIB_TRAP(FfsLibTrapGetdrive);

/* set default drive, and return number of valid drives */
```

```
extern void FfsSetdrive(UInt16 libRef, UInt16 drive, UInt16 *ndrives)
        FFS_LIB_TRAP(FfsLibTrapSetdrive);

/* delete a file (same as FfsRemove) */
extern Err FfsUnlink(UInt16 libRef, char *path)
        FFS_LIB_TRAP(FfsLibTrapUnlink);

/* determine if end-of_file */
extern Err FfsEof(UInt16 libRef, Int16 handle)
        FFS_LIB_TRAP(FfsLibTrapEof);

/* create a file */
extern Int16 FfsCreat(UInt16 libRef, char *path, Int16 mode)
        FFS_LIB_TRAP(FfsLibTrapCreat);

/* install the critical error handler callback function */
extern void FfsInstallErrorHandler(UInt16 libRef, Int16 (*CritErr)(Int16, Int16, char
*))
        FFS_LIB_TRAP(FfsLibTrapInstErrHandle);

/* uninstall the critical error handler callback function */
extern void FfsUnInstallErrorHandler(UInt16 libRef)
        FFS_LIB_TRAP(FfsLibTrapUnInstErrHandle);

/* turn on serial debugging */
extern void FfsSetDebuggingOn(UInt16 libRef, UInt16 s_port, UInt16 level)
        FFS_LIB_TRAP(FfsLibTrapSetDebuggingOn);

/* turn off serial debugging */
extern void FfsSetDebuggingOff(UInt16 libRef)
        FFS_LIB_TRAP(FfsLibTrapSetDebuggingOff);

/* check for inserted card */
extern Boolean FfsCardIsInserted(UInt16 libRef, UInt8 drive_num)
        FFS_LIB_TRAP(FfsLibTrapCardIsInserted);

/* for internal FAT testing only */
extern Err FfsExerciseFAT(UInt16 libRef, UInt8 drive_num)
        FFS_LIB_TRAP(FfsLibTrapExerciseFAT);

/* check if inserted card is an ATA type card */
extern Boolean FfsCardIsATA(UInt16 libRef, UInt8 drive_num)
        FFS_LIB_TRAP(FfsLibTrapCardIsATA);

/* system use only! */
```

```
extern Boolean FfsChangeOccurred(UInt16 libRef)
            FFS_LIB_TRAP(FfsLibTrapChangeOccurred);

/*---------------------------------------------------------
 * For loading the library in PalmPilot Mac emulation mode
 *--------------------------------------------------------*/ extern Err FfsLibInstall(UInt16 libRef, SysLibTblEntryPtr entryP);

ifdef __cplusplus
}
endif endif  // __FFS_LIB_H__
```

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

We claim:

1. A handheld computer comprising:

a CPU executing an operating system in which executable programs are directly accessed from a permanent data storage in a database format; where said database format applies equally to data files; and, file management software for use with said CPU for manipulation of files in non-palm file formats.

2. A handheld computer of claim 1 wherein said file management software is software for use with an Ffs.

3. A handheld computer of claim 2 further comprising an interface program disposed between said operating system and said software for use with said Ffs.

4. A handheld computer of claim 3 wherein said interface software is implemented as a shared library.

5. A handheld computer of claim 4 wherein said shared library permits manipulation of a stored file in a secondary storage media without a requirement to load said stored file into said permanent data storage.

6. A handheld computer of claim 5 wherein said permanent data storage is RAM.

7. A handheld computer of claim 5 wherein said permanent data storage is a flash memory.

8. A handheld computer of claim 4 wherein said shared library performs the functions of disk management, directory management, file access, file management, library management, and error handling.

9. A handheld computer of claim 8 wherein said shared library performs the functions of mapping a plurality of library function calls to a plurality of corresponding system trap instructions, through which all library routines are accessed.

10. A method of manipulating files in a handheld computer, of the type which uses a palm operating system, the method comprising the steps of:

providing a shared library for access by applications running on said handheld computer, said shared library including routines for interfacing a FAT file system with an operating system of the type otherwise incapable of opening non-palm file formats;

providing a secondary storage media for storing files thereon in non-palm file formats;

opening an application on said palm operating system with the use of permanent data storage directly accessible with the use of said palm operating system; and, opening a file from said secondary storage media, without loading said file into said permanent data storage directly accessible with the use of said palm operating system, by using said shared library.

11. An instruction set for use on a handheld computer, said instruction set including:

operating system means for accessing files other than files in non-palm file formats;

means for implementing an Ffs in a secondary storage media; and, means for interfacing said means for accessing files other than files in non-palm file formats with said means for implementing an Ffs in a secondary storage media.

12. An instruction set of claim 11 wherein said secondary storage media is a compact flash media.

13. An instruction set of claim 11 wherein said secondary storage media is a multimedia card.

14. An instruction set of claim 11 wherein said secondary storage media is a disk drive.

15. An instruction set of claim 11 wherein said handheld computer is a handheld telephone having a microprocessor therein.

16. A method of claim 10 wherein said handheld computer is a handheld telephone having a microprocessor therein.

17. A handheld computer of claim 1 wherein said handheld computer is a handheld telephone having a microprocessor therein.

18. A handheld computer of claim 1 wherein said handheld computer is a handheld scanner having a microprocessor therein.

19. A handheld computer of claim 9 wherein said handheld computer is a handheld telephone having, a microprocessor therein.

20. A handheld computer of claim 9 wherein said handheld computer is a handheld scanner having a microprocessor therein.

* * * * *